Patented Feb. 9, 1937

2,069,983

UNITED STATES PATENT OFFICE 2,069,983

COATING COMPOSITION

Richard T. Ubben, Wilmington, Del., assignor to E. I. du Pont de Nemours & Company, Wilmington, Del., a corporation of Delaware No Drawing. Application April 26, 1933, Serial No. 668,032

4 Claims. (Cl. 134—26)

This invention relates to film-forming and coating compositions and more particularly to novel compositions of the character described, including polymerized methyl methacrylate.

Heretofore the basic film-forming ingredients of useful protective coating compositions have been of three types: (1) the brittle gums of spirit varnishes, (2) the drying oils and drying oil combinations on which practically all modern paints and varnishes are based, and (3) nitrocellulose, from which present day lacquer and lacquer enamels derive their toughness and fast-drying properties. In recent years, a number of new cellulose derivatives have been developed but so far none of these has possessed sufficient merit to displace nitrocellulose as the basis of lacquer type finishes. Cellulose acetate, while having the advantage over nitrocellulose of being non-inflammable, lacks sufficient water resistance and durability to be generally useful and its limited compatibility characteristics have militated against the formulation of satisfactory coating compositions. Ethyl cellulose and benzyl cellulose, although superior to cellulose acetate in water resistance, still lack the necessary film qualities to displace nitrocellulose. Recent research has produced a very large number of new synthetic resins. Many of these are drying oil derivatives and, although superior to the ordinary varnish type vehicles, they still depend on the relatively slow surface oxidation of unsaturated fatty acid components of drying oils for their film-forming properties. The majority of the new synthetic resins are similar to the old varnish gums or the resins used with nitrocellulose and are not capable of forming the basis of tough, fast-drying, durable films, but must depend on drying oils or nitrocellulose for these properties. Still others are capable of forming the basis of new types of coating compositions and have been found commercially useful for special purposes in spite of certain limitations, such as dark color or rapid discoloration, corrosiveness, slow drying, reactivity with some pigments, and thermoplasticity.

One of the most attractive synthetic resin-forming reactions which has received attention in past years is the polymerization of vinyl derivatives. These resins are characterized by good film-forming properties, freedom from extreme brittleness, and a very light color. Their main disadvantage is their tendency to be too soft or to soften at relatively low temperatures, and coating compositions containing them are soft or print readily at temperatures slightly above ordinary room temperatures, such as are often encountered in hot climates, on the hoods of automobiles, or in numerous industrial uses.

In view of the foregoing and other disadvantages inherent in compositions of the prior art, it is an object of the present invention to provide improved protective and decorative coating compositions.

Other objects and advantages of the invention will be apparent as it is better understood by reference to the following specification in which its details and preferred embodiments are described.

It has been found that valuable coating compositions may be prepared from polymerized methyl methacrylate (methyl ester of alpha-methylacrylic acid). Methyl methacrylate may be made by chlorinating isobutyric acid, esterifying the resultant chlorisobutyric acid with methanol, and removing hydrogen chloride from the methyl chlorisobutyrate. This process is described in the copending application of D. J. Loder, Ser. No. 593,411, filed Feb. 16, 1932. Methyl methacrylate may also be prepared by treating methyl alpha-hydroxyisobutyrate with a dehydrating agent, e. g. phosphorus pentoxide or chlorosulphonic acid.

The liquid methyl methacrylate may be polymerized with the aid of radiant energy (light or heat) with or without a catalyst. The polymerization should be carried to completion or, if not, the monomeric ester should be removed. For example, polymerization may readily be effected by adding 0.5% by weight of benzoyl peroxide and heating the mixture at 100° C. for four hours. The white product, having somewhat the appearance of pumice, may be used in the manufacture of the coating compositions of this invention. In the preparation of the compositions the polymer is preferably used in a subdivided condition to facilitate solution.

The polymeric esters of methacrylic and acrylic acids differ strikingly in their softening temperatures as well as in their hardness and toughness, as evidenced by the following table:

| Polymer | Softening temperature | Properties at room temperature |
|---|---|---|
| Polymeric methyl acrylate | | Soft resin at room temperatures |
| Polymeric ethyl acrylate | | Soft resin at room temperatures |
| Polymeric butyl acrylate | | Soft resin at room temperatures |
| Polymeric methyl methacrylate | 125° C. | Hard and tough |
| Polymeric ethyl methacrylate | 75° C. | Hard and somewhat brittle |
| Polymeric propyl methacrylate | 45° C. | Hard and very brittle |
| Polymeric butyl methacrylate | 35–40° C. | Slightly soft and brittle |

It can be seen from the above data that methyl methacrylate polymer is unique, not only in its softening temperature, hardness, and toughness, but also in other properties, as will be more fully pointed out below. I have found that methyl methacrylate polymer is ideally suited as a basic film-forming material for an entirely new type of coating composition. It forms films which combine the properties of hardness, toughness, rapid-

ated hydrocarbons, such as chlorinated diphenyls and dichlordibenzyl; ether compounds such as dicresoxyethyl ether.

The following example illustrates a polymeric methyl methacrylate lacquer containing a resin and a plasticizer:

*Example 4*

| | Parts |
|---|---|
| Methyl methacrylate polymer | 14.2 |
| Coumarone resin | 14.2 |
| Dibutyl phthalate | 7.1 |
| Toluene | 50.2 |
| Xylene | 14.3 |

The methyl methacrylate polymer is similar to that used in Example 2. The lacquer has a viscosity of 0.75 poise and when sprayed flows out to give a smooth, hard, glossy, and tough film. It is especially well adapted to the coating of wood and other surfaces requiring a coating of pliable character.

Soft resins, combining in one substance the softening properties of a plasticizer and the adhesive characteristics of a gum, may be used in lieu of separate plasticizers and resins. The oil-modified polyhydric alcohol-polybasic acid resins are substances of this type and the cocoanut oil-modified composition described in the following example has been found especially useful for this purpose.

*Example 5*

| | Parts |
|---|---|
| Methyl methacrylate polymer | 24 |
| Cocoanut oil-modified polyhydric alcohol-polybasic acid resin | 12 |
| Toluene | 28 |
| Butyl acetate | 21 |
| Xylene | 15 |

The methyl methacrylate polymer used is similar to that of Example 2. The cocoanut oil-modified resin may be made by heating 5.93 parts glycerol, 21.26 parts diethylene glycol, and 33.54 parts cocoanut oil in a closed kettle provided with a reflux condenser and stirring device. The temperature is brought to 250° C. in one hour and held there for 2 hours. 39.27 parts phthalic anhydride is then added and the temperature brought back to 250° C. as rapidly as possible and maintained there for one hour. The condenser is then removed and heating continued at the same temperature until the resin product shows an acid number of 20.

According to a further feature of the invention polymeric methyl methacrylate coating compositions may include a cellulose derivative, preferably with a plasticizer. Although any of the common cellulose derivatives may be used, e. g. esters, such as nitrocellulose, cellulose acetate and propionate, and ethers, such as ethyl and benzyl cellulose, the compatibility of methyl methacrylate polymer with all but nitrocellulose is limited. A coating composition containing methyl methacrylate polymer, nitrocellulose and a plasticizer, adapted for the coating of a variety of articles and types of surfaces, is illustrated in the following example.

*Example 6*

| | Parts |
|---|---|
| Methyl methacrylate polymer | 8 |
| Nitrocellulose (½ second) | 8 |
| Dibutyl phthalate | 6 |
| Ethyl acetate | 14 |
| Toluene | 20 |
| Ethyl lactate | 2 |
| Butyl acetate | 42 |

The characteristics of the above may, of course, be modified by addition of natural or synthetic resins.

It is to be understood that fillers, lakes, pigments, dyes, etc. can be added to any of the compositions described in the preceding examples. An enamel consisting of methyl methacrylate, solvent and pigment dries very rapidly, but the resulting film is lacking in gloss. I have found, however, that a glossy enamel can be obtained by including a resin with the methyl methacrylate polymer, solvent and pigment. A plasticizer may or may not be required, depending upon the use to which the composition is to be put. An enamel of this type is illustrated in the following example.

*Example 7*

| | Parts |
|---|---|
| Methyl methacrylate polymer | 10 |
| Heptyl phenol-aldehyde resin | 10 |
| Toluene | 50 |
| Xylene | 14 |
| TiO$_2$ | 16 |

The methyl methacrylate polymer used in Example 1 may be employed here, but, if a spraying enamel is desired, the low viscosity polymer of Example 2 should be employed. The phenol-aldehyde resin is prepared from

| | Parts |
|---|---|
| Heptyl phenol | 610 |
| Formaldehyde (30% solution) | 330 |
| NaOH | 4.4 |
| Water | 17.6 |

These ingredients are mixed and heated for 24 hours at 90–100° C. The product is acidified, washed with water, then heated in a vacuum oven at 105° C. for 21 hours.

The enamel is prepared by grinding this resin, methyl methacrylate polymer, solvents and pigment, the proportions being as stated, in a ball mill in the presence of flint pebbles for 48 hours. It will be understood that varying proportions of pigment to binder may be employed and that, depending upon the color desired, other pigments may be used, such as Prussian blue, carbon black, zinc oxide, paratoner red, etc.

The phenol-aldehyde resin employed above is of the non-heat-hardening type. For certain uses the employment of a heat-hardening phenol-resin may be preferred, such, for example, as may be prepared by reaction of dihydroxydiphenyldimethylmethane and an aldehyde.

Various changes may be made in the compositions, individual ingredients, proportions thereof, and methods of compounding and applying the same without departing from the invention or sacrificing the advantages thereof.

I claim:

1. A coating composition comprising methyl methacrylate polymer and a resin selected from the class consisting of polyhydric alcohol-polybasic acid resins, coumarone resins, and phenol-aldehyde resins.

2. A coating composition comprising methyl methacrylate polymer and a cocoanut oil modified polyhydric alcohol-polybasic acid resin.

3. A coating composition comprising methyl methacrylate polymer and coumarone resin.

4. A coating composition comprising methyl methacrylate polymer and a heptyl phenol-formaldehyde resin.

RICHARD T. UBBEN.